US011425520B2

(12) United States Patent
Yan

(10) Patent No.: US 11,425,520 B2
(45) Date of Patent: Aug. 23, 2022

(54) METHOD FOR DETECTING BLOCKING OF MICROPHONE AND RELATED PRODUCTS

(71) Applicant: GUANGDONG OPPO MOBILE TELECOMMUNICATIONS CORP., LTD., Guangdong (CN)

(72) Inventor: Congwei Yan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/155,841

(22) Filed: Jan. 22, 2021

(65) Prior Publication Data

US 2021/0144500 A1 May 13, 2021

Related U.S. Application Data

(63) Continuation of application No. PCT/CN2019/088021, filed on May 22, 2019.

(30) Foreign Application Priority Data

Jul. 26, 2018 (CN) .......................... 201810841699.2

(51) Int. Cl.
*H04R 29/00* (2006.01)
*G06F 3/01* (2006.01)
(Continued)

(52) U.S. Cl.
CPC ............ *H04R 29/005* (2013.01); *G06F 3/017* (2013.01); *G06F 3/041* (2013.01); *G10L 25/51* (2013.01);
(Continued)

(58) Field of Classification Search
CPC ...... H04R 29/005; H04R 1/08; H04R 1/1016; H04R 1/1041; H04R 1/406; H04R 3/005;
(Continued)

(56) References Cited

U.S. PATENT DOCUMENTS 10,244,307 B1 * 3/2019 Tong ..................... H04R 1/1091
2014/0172421 A1 * 6/2014 Liu ........................ H04R 1/1083
381/94.1
(Continued)

FOREIGN PATENT DOCUMENTS

CN 101911730 A 12/2010
CN 105323363 A 2/2016
(Continued)

OTHER PUBLICATIONS

OA1 with English Translation issued in corresponding CN application No. 201810841699.2 dated Aug. 15, 2019.
(Continued)

*Primary Examiner* — William A Jerez Lora
(74) *Attorney, Agent, or Firm* — Young Basile Hanlon & MacFarlane, P.C.

(57) ABSTRACT

A method for detecting blocking of a microphone and related products are provided. The method includes the following. A first electric quantity of a first wireless earphone and a second electric quantity of a second wireless earphone are determined when both the first wireless earphone and the second wireless earphone are worn. A first operation and a second operation are performed in parallel when the first electric quantity is greater than the second electric quantity, where the first operation is to obtain first audio through the first microphone, and the second operation is to obtain second audio through the second microphone. A reference parameter of the second audio is determined. The first wireless earphone is determined to be blocked in response to detecting that a first parameter of the first audio does not match the reference parameter.

20 Claims, 5 Drawing Sheets

(51) Int. Cl.
*G06F 3/041* (2006.01)
*G10L 25/51* (2013.01)
*H04R 1/10* (2006.01)
*H04R 1/40* (2006.01)
*H04R 3/00* (2006.01)

(52) U.S. Cl.
CPC ......... *H04R 1/1016* (2013.01); *H04R 1/1025* (2013.01); *H04R 1/1041* (2013.01); *H04R 1/406* (2013.01); *H04R 3/005* (2013.01); *G06F 2203/04105* (2013.01); *H04R 2420/07* (2013.01)

(58) Field of Classification Search
CPC . H04R 2420/07; G10L 15/1815; G10L 15/22; G10L 25/51
USPC ................................ 381/56, 58, 74, 91, 370
See application file for complete search history.

(56) References Cited

U.S. PATENT DOCUMENTS

| | | |
|---|---|---|
| 2015/0172816 A1 | 6/2015 | Ivanov et al. |
| 2015/0304786 A1 | 10/2015 | Partio et al. |
| 2016/0050488 A1* | 2/2016 | Matheja ................... H04R 3/00 381/56 |
| 2019/0014429 A1* | 1/2019 | Luke ...................... H04R 3/005 |
| 2019/0387304 A1* | 12/2019 | Song ....................... G06F 3/165 |

FOREIGN PATENT DOCUMENTS

| | | |
|---|---|---|
| CN | 105554202 A | 5/2016 |
| CN | 105979053 A | 9/2016 |
| CN | 106302905 A | 1/2017 |
| CN | 106453970 A | 2/2017 |
| CN | 106911996 A | 6/2017 |
| CN | 107210824 A | 9/2017 |
| WO | 2005120177 A2 | 12/2005 |
| WO | 2017035771 A1 | 3/2017 |

OTHER PUBLICATIONS

ISR with English Translation issued in corresponding international application No. PCT/CN2019/088021 dated Jul. 24, 2019.
Extended European Search Report for EP Application 19840201.8 dated Jul. 5, 2021. (6 pages).

* cited by examiner

METHOD FOR DETECTING BLOCKING OF MICROPHONE AND RELATED PRODUCTS

CROSS-REFERENCE TO RELATED APPLICATION(S)

This application is a continuation of International Application No. PCT/CN2019/088021, filed on May 22, 2019, which claims priority to Chinese Patent Application No. 201810841699.2, filed on Jul. 26, 2018, the entire disclosures of which are incorporated herein by reference.

TECHNICAL FIELD

This disclosure relates to the field of wireless earphone technology, and more particularly to a method for detecting blocking of a microphone and related products.

BACKGROUND

With wide spread and rapid development of mobile terminals (e.g., smart phones), various earphones are often used to listen to media. Moreover, an earphone cable of a wired earphone is often damaged, which results to a short life and high cost of the earphone, and wireless earphones come into being.

Currently, it is found that a hole of a microphone of a wireless earphone is often blocked, by such as dust, water droplets, etc., which results to intermittence and low volume of voice data obtained through the microphone of the wireless earphone and affects normal use of the wireless earphone.

SUMMARY

Implementations provide a method for detecting blocking of a microphone and related products.

In a first aspect, a method for detecting blocking of a microphone is provided. The method is applicable to a wireless earphone that is connected with a mobile terminal, the wireless earphone includes a first wireless earphone and a second wireless earphone, the first wireless earphone has a first microphone, and the mobile terminal has a second microphone. The method includes the following. A first electric quantity of the first wireless earphone and a second electric quantity of the second wireless earphone are determined when both the first wireless earphone and the second wireless earphone are worn. A first operation and a second operation are performed in parallel when the first electric quantity is greater than the second electric quantity, where the first operation is to obtain first audio through the first microphone, and the second operation is to obtain second audio through the second microphone. A reference parameter of the second audio is determined. The first wireless earphone is determined to be blocked in response to detecting that a first parameter of the first audio does not match the reference parameter.

In a second aspect, an apparatus for detecting blocking of a microphone is provided. The apparatus is applicable to a wireless earphone that is connected with a mobile terminal, the wireless earphone includes a first wireless earphone and a second wireless earphone, the first wireless earphone has a first microphone, and the mobile terminal has a second microphone. The apparatus includes a determining unit, a receiving unit, and a detecting unit. The determining unit is configured to determine a first electric quantity of the first wireless earphone and a second electric quantity of the second wireless earphone when both the first wireless earphone and the second wireless earphone are worn. The receiving unit is configured to perform a first operation and a second operation in parallel when the first electric quantity is greater than the second electric quantity, where the first operation is to obtain first audio through the first microphone, and the second operation is to obtain second audio through the second microphone. The determining unit is further configured to determine a reference parameter of the second audio. The detecting unit is configured to determine that the first wireless earphone is blocked in response to detecting that a first parameter of the first audio does not match the reference parameter.

In a third aspect, a wireless earphone is provided. The wireless earphone includes a processor, a memory, and one or more programs stored in the memory and executed by the processor. The one or more programs include instructions for performing the method described in the first aspect.

In a fourth aspect, a non-transitory computer-readable storage medium is provided. The non-transitory computer-readable storage medium is configured to store computer programs for electronic data interchange (EDI). The computer programs include instructions for performing some or all operations of the method described in the first aspect.

In a fifth aspect, a computer program product is provided. The computer program product includes a non-transitory computer-readable storage medium that stores computer programs. The computer programs are operable with a computer to execute some or all operations of the method described in the first aspect. The computer program product may be a software installation package.

BRIEF DESCRIPTION OF DRAWINGS

The following will give a brief description of accompanying drawings used for describing the implementations.

DETAILED DESCRIPTION

In order for those skilled in the art to better understand technical solutions of implementations, technical solutions of implementations will be described clearly and completely with reference to accompanying drawings in the implementations. Apparently, implementations hereinafter described are merely some implementations, rather than all implementations, of the disclosure. All other implementations obtained by those of ordinary skill in the art based on the implementations herein without creative efforts shall fall within the protection scope of the disclosure.

The terms "first", "second", "third", and the like used in the specification, the claims, and the accompany drawings of the disclosure are used to distinguish different objects rather than describe a particular order. The terms "include", "include", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "implementation" referred to herein means that a particular feature, structure, or character described in conjunction with the implementation may be contained in at least one implementation of the disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

Figure 1:
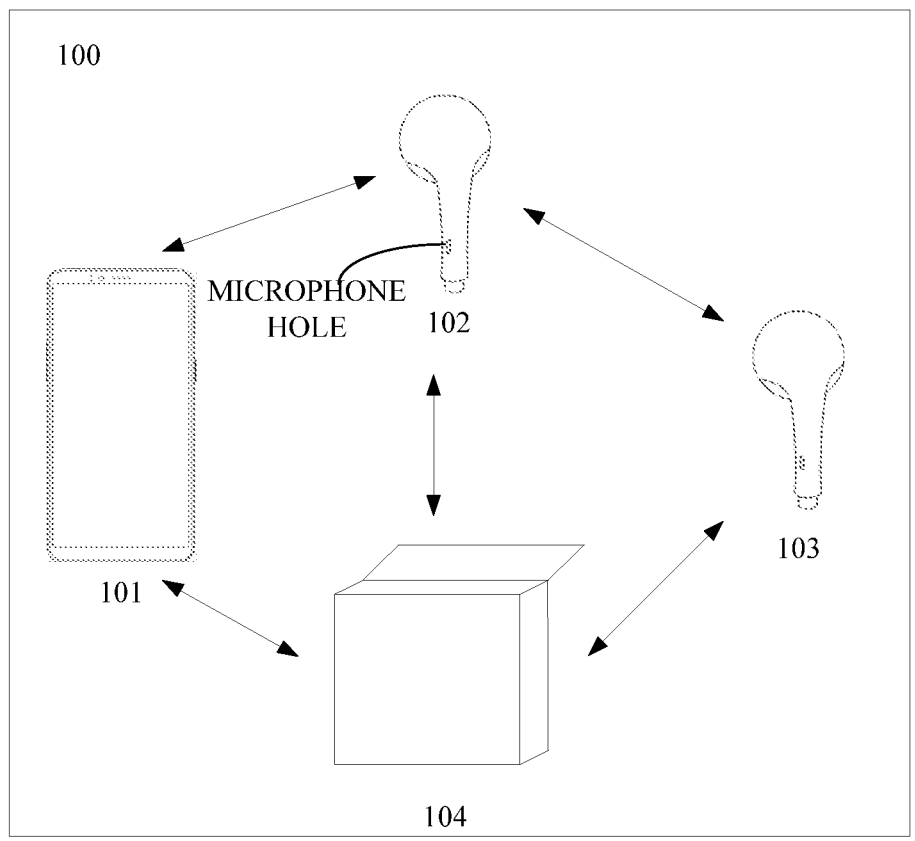
FIG. 1 is a schematic structural diagram of a wireless earphone system according to implementations.

Implementations of the present disclosure provide a wireless earphone system 100. As illustrated in FIG. 1, the system includes a mobile terminal 101, a first wireless earphone 102, a second wireless earphone 103, and a charging box (i.e., a charging case) 104. The first wireless earphone 102 and the second wireless earphone 103 can support wired or wireless charging. For example, the first wireless earphone 102 and the second wireless earphone 103 can be charged in the charging box 104. The system can adopt any one of the following communication mechanisms. For example, a first communication link is established between the mobile terminal 101 and the first wireless earphone 102, and a second communication link is established between the first wireless earphone 102 and the second wireless earphone 103, that is, communications between the first wireless earphone 102 and the mobile terminal 101 and between the second wireless earphone 103 and the mobile terminal 101 adopt a master-slave communication mechanism (specifically, a Bluetooth protocol can be used). For another example, a first communication link is established between the mobile terminal 101 and the first wireless earphone 102, and a second communication link is established between the mobile terminal 101 and the second wireless earphone 103, that is, both the first wireless earphone 102 and the second wireless earphone 103 are master earphones which can communicate with the mobile terminal 101 directly. A master earphone can directly establish a communication link with the mobile terminal 101 and exchange data of a preset type with the mobile terminal 101. A slave earphone can exchange data of the preset type with the mobile terminal 101 through a transfer of the master earphone. Data of the preset type includes at least one of media data and call data, where the media data is at least one of audio data and video data of the mobile terminal 101 other than call voice data, and the call data is the call voice data of the mobile terminal 101. Similarly, communication connectivity between the charging box 104 and any of the first wireless earphone 102 and the second wireless earphone 103 is the same as that between the mobile terminal 101 and any of the first wireless earphone 102 and the second wireless earphone 103, which is not repeated herein. The first wireless earphone 102 and the second wireless earphone 103 may be Bluetooth wireless earphones and the like. The mobile terminal 101 may include various handheld devices, in-vehicle devices, wearable devices (such as smart watches, smart bracelets, pedometers, etc.), computing devices that have wireless communication functions or other processing devices connected to a wireless modem, as well as various forms of user equipments (UE), mobile stations (MS), terminal devices, and the like. For ease of description, the above-mentioned devices are collectively referred to as a mobile terminal. Hereinafter, detailed description of implementations of the present disclosure will be given below.

Figure 2:
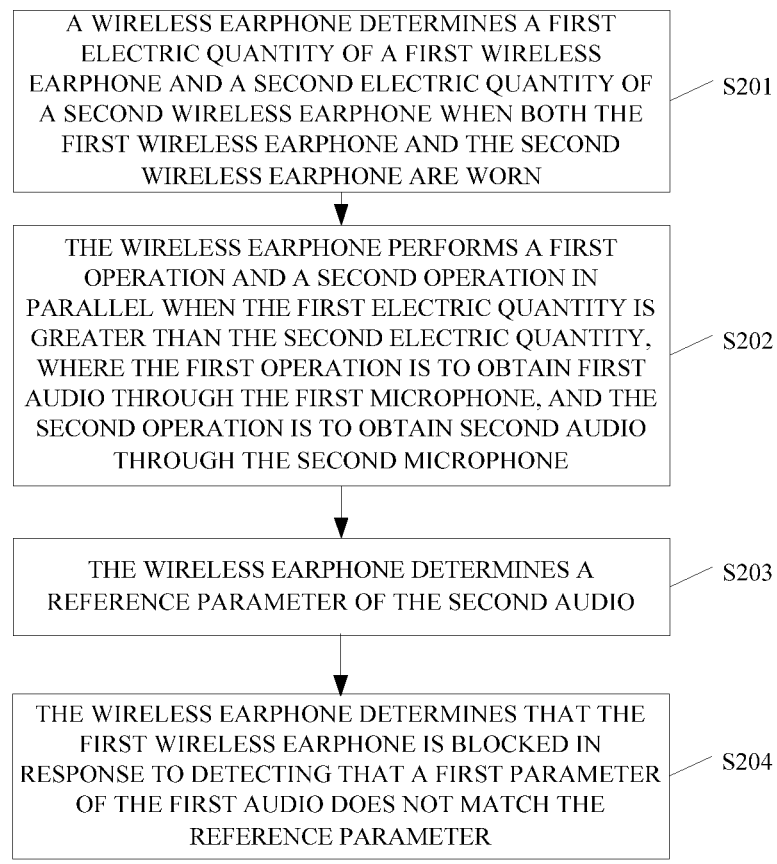
FIG. 2 is a schematic flowchart of a method for detecting blocking of a microphone according to implementations.

FIG. 2 is a schematic flowchart of a method for detecting blocking of a microphone according to implementations. The method is applicable to a wireless earphone that is connected with a mobile terminal wirelessly, the wireless earphone includes a first wireless earphone and a second wireless earphone, the first wireless earphone has a first microphone, and the second wireless earphone has a second microphone. As illustrated in FIG. 2, the method for detecting blocking of a microphone includes the following.

S201, the wireless earphone determines a first electric quantity of the first wireless earphone and a second electric quantity of the second wireless earphone when both the first wireless earphone and the second wireless earphone are worn.

The wireless earphone can determine whether the first wireless earphone and the second wireless earphone are worn through multiple proximity sensors or pressure sensors by detecting contact with an auricle, or determine whether the first wireless earphone and the second wireless earphone are worn according to gesture parameters of the first wireless earphone and the second wireless earphone, or determine whether the first wireless earphone and the second wireless earphone are worn by detecting communication identifiers which are indicative of successful communications between both the first wireless earphone and the second wireless earphone and the mobile terminal, or determine whether the first wireless earphone and the second wireless earphone are worn by detecting a music playback message (which is used to instruct the first wireless earphone and the second wireless earphone to play music), which are not limited herein.

S202, the wireless earphone performs a first operation and a second operation in parallel when the first electric quantity is greater than the second electric quantity, where the first operation is to obtain first audio through the first microphone, and the second operation is to obtain second audio through the second microphone.

The second microphone of the mobile phone is determined to be not blocked in advance, and therefore a parameter of the second audio can be seen as the reference parameter. The first audio and the second audio may be user's voice data to be obtained, audio from a speaker of the wireless earphone to be obtained, or the like, which is not limited herein.

S203, the wireless earphone determines a reference parameter of the second audio.

The reference parameter of the second audio can be determined by the first wireless earphone or the second wireless earphone. When the reference parameter of the second audio is determined by the second wireless earphone, since the process of obtaining the first audio through the first microphone may consume more power than the process of determining the reference parameter of the second audio, the first wireless earphone with a higher electric quantity rather than two wireless earphones is used to obtain voice data to detect blocking, the second wireless earphone may only need to obtain the reference parameter, which is beneficial to improve overall usage time of the wireless earphone and improve intelligence of blocking detection. After the reference parameter of the second audio is determined by the second earphone, the second earphone can send the reference parameter determined to the first earphone for determining whether the first wireless earphone is blocked. When the reference parameter of the second audio is determined by the first wireless earphone, the first wireless earphone with a higher electric quantity is selected to obtain the first voice data to detect blocking and determine the reference parameter of the second audio, which is also beneficial to improve overall usage time of the wireless earphone. The reference parameter includes at least one of: volume, energy, timbre, and audio frequency, which is not limited herein.

Audio is a kind of a sound wave, and the sound wave is a kind of a mechanical wave. Therefore, the sound wave itself has energy. The energy can be calculated according to a density of a propagation medium, a frequency, amplitude, and a wave speed, that is, energy of sound per unit area can be represented by an average of energy flowing through per unit area of a medium per unit time.

S204, the wireless earphone determines that the first wireless earphone is blocked in response to detecting that a first parameter of the first audio does not match the reference parameter.

Specifically, the first wireless earphone can be determined to be blocked by the first wireless earphone or the second wireless earphone. When the wireless earphone detects that the first parameter of the first audio does not match the reference parameter, a matching degree between the first parameter and the reference parameter is less than a preset threshold matching degree, or a difference between the first parameter of the first audio and the reference parameter is greater than a preset threshold difference, which is not limited herein.

As can be seen, in this implementation, when both the first wireless earphone and the second wireless earphone are worn, the wireless earphone first determines the first electric quantity of the first wireless earphone and the second electric quantity of the second wireless earphone. When the first electric quantity is greater than the second electric quantity, the wireless earphone performs the first operation and the second operation in parallel, where the first operation is to obtain the first audio through the first microphone, and the second operation is to obtain the second audio through the second microphone. The wireless earphone then determines the reference parameter of the second audio. When the first parameter of the first audio does not match the reference parameter, the wireless earphone determines that the first wireless earphone is blocked. As such, the wireless earphone can detect whether the microphone is blocked without increasing a hardware structure, therefore enriching functions of the wireless earphone and improving convenience of blocking detection. Moreover, the second microphone of the mobile terminal obtains the second audio while the first wireless earphone obtains the first audio, and a parameter of the second audio rather than a preset threshold is used as the reference parameter, so as to detect whether the first microphone of the first wireless earphone is blocked, which is helpful to eliminate environmental interference and improve accuracy of blocking detection. In addition, when both wireless earphones are worn, the first wireless earphone with a higher electric quantity rather than two wireless earphones is used to obtain voice data to detect blocking, the second wireless earphone may only need to obtain the reference parameter, which is beneficial to improve overall usage time of the wireless earphone and improve intelligence of blocking detection.

As an implementation, the first parameter of the first audio is detected not to match the reference parameter by detecting that a difference between the first parameter of the first audio and the reference parameter is greater than a preset threshold difference, where the first parameter includes at least one of: volume, energy, timbre, and audio frequency.

The preset threshold difference may be an empirical value, which is preset in the wireless earphone by a technical developer before delivery, which is not limited here.

It can be seen that, in this implementation, the wireless earphone determines that the first parameter of the first audio does not match the reference parameter by comparing the difference between the first parameter and the reference parameter with the preset threshold difference, which is simple in algorithm and is beneficial to improve speed of blocking detection.

As an implementation, when the first electric quantity is greater than the second electric quantity, the first operation and the second operation are performed in parallel as follows. When the first electric quantity is greater than the second electric quantity, the second electric quantity is compared with a third electric quantity of the mobile terminal. The first operation and the second operation are performed in parallel in response to determining that the second electric quantity is less than the third electric quantity.

It can be seen that, in this implementation, when the wireless earphone detects that the first electric quantity is greater than the second electric quantity, both the second wireless earphone and the mobile terminal can be selected to obtain the reference parameter. The second mobile terminal is selected to obtain the reference parameter when the third electric quantity is greater than the second electric quantity, which is conducive to realizing power balance between the wireless earphone and the mobile terminal and increasing usage time of both the wireless earphone and the mobile terminal.

As an implementation, the method further includes the following before the first electric quantity of the first wireless earphone and the second electric quantity of the second wireless earphone are determined. An acquisition instruction for first audio data is received. The first audio and the second audio are part of the first audio data and the method further includes the following after the first wireless earphone is determined to be blocked when the second wireless earphone is not blocked. The first microphone is disabled and to a third microphone of the second wireless earphone is switched to obtain third audio, where the third audio is audio data other than the first audio in the first audio data.

The first audio and the second audio are part of the first audio data, for example, the first audio may the same as the second audio or the first audio may be different from the second audio. The first audio data is voice data to be obtained by the wireless earphone. The first audio data may be audio data that needs to be obtained by a microphone and sent to a peer when a voice or video chat application is used, or audio data that needs to be obtained when the user communicates with a teammate in the process of using a game application, which is not limited herein.

The acquisition instruction may be an instruction triggered by the mobile terminal being operated when a microphone is required to record audio data. The instruction may be a double-click or long press on a designated area of a touch screen, etc., and sent from the mobile terminal to the wireless earphone. Or the acquisition instruction may be an instruction triggered by the wireless earphone being operated the microphone is required to record voice data. The instruction may be tapping the wireless earphone or double-clicking the wireless earphone, etc., which is not limited herein.

The first audio and the second audio are part of the audio data, that is, the data amount of the first audio and the second audio can meet the data amount of blocking detection, which may be first 10 ms or the first 20 ms of the audio data, which is not limited herein.

It can be seen that, in this implementation, when the wireless earphone detects the acquisition instruction for first audio data, the wireless earphone starts blocking detection after the wireless earphone obtains part of the data, which is beneficial to improve real-time performance of blocking detection. When the first wireless earphone is detected to be blocked, the second wireless earphone is switched in time to obtain following voice data, which is beneficial to improve timeliness of implementing measures after detecting that a microphone-hole is blocked.

As an implementation, the method further includes the following after the first wireless earphone is determined to be blocked. A fourth electric quantity of the mobile terminal and a fifth electric quantity of the second wireless earphone are determined in response to receiving an acquisition instruction for second audio data. The second audio data is obtained through the mobile terminal when the fourth electric quantity is greater than the fifth electric quantity.

Regarding to the acquisition instruction for second audio data, reference can be made to the acquisition instruction for first audio data, which is not limited herein.

Therefore, in this implementation, after the wireless earphone detects that the first microphone of the first wireless earphone is blocked, when the acquisition instruction for the second audio data is detected, the fourth electric quantity of the mobile terminal and the fifth electric quantity of the second wireless earphone are determined respectively, the mobile terminal with a greater electric quantity is used to obtain the second audio data, which is beneficial to improve flexibility of obtaining the second audio data, and intelligence of implementing measures after detecting that a microphone-hole is blocked.

As an implementation, the method further includes the following after the first wireless earphone is determined to be blocked. A notification message is sent to a charging box in response to detecting that both the first wireless earphone and the second wireless earphone are charged in the charging box. The notification message is for indicating that the first wireless earphone is blocked and instructing the charging box to charge the first wireless earphone with a first charging power and to charge the second wireless earphone with a second charging power, where the first charging power is less than the second charging power.

The notification message may be a communication identifier, for example, communication identifier '1' is indicative of blocking, and communication identifier '2' is indicative of non-blocking, which is not limited herein. When both the first wireless earphone and the second wireless earphone are charged in the charging box, during the same charging period, the first wireless earphone with a greater charging power being charged will get more power.

It can be seen that, in this implementation, the wireless earphone reports the notification message to the charging box after determining that the first microphone is blocked, so that when the charging box charges the first wireless earphone and the second wireless earphone at the same time, the charging power allocated to the second wireless earphone is greater than the charging power allocated to the first wireless earphone due to the second wireless earphone being used more, which is beneficial to increase usage time of the second wireless earphone in a normal state.

Figure 3:
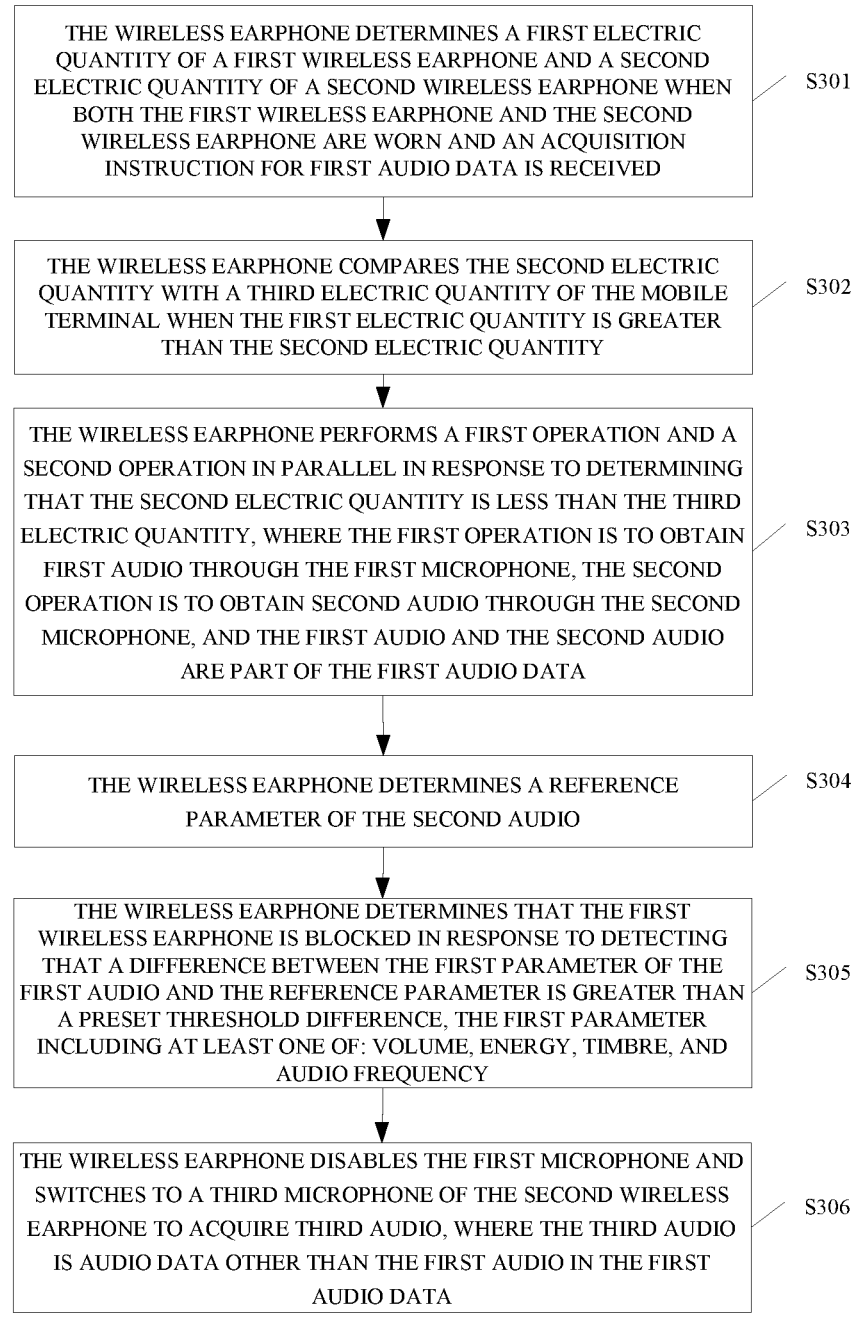
FIG. 3 is a schematic flowchart of a method for detecting blocking of a microphone according to other implementations.

Similar to implementations illustrated in FIG. 2, FIG. 3 is a schematic flowchart of a method for detecting blocking of a microphone according to implementations. The method is applicable to a wireless earphone that is connected with a mobile terminal, the wireless earphone includes a first wireless earphone and a second wireless earphone, the first wireless earphone has a first microphone, and the mobile terminal has a second microphone. As illustrated in FIG. 3, the method for detecting blocking of a microphone includes the following.

S301, when both the first wireless earphone and the second wireless earphone are worn and an acquisition instruction for first audio data is received, the wireless earphone determines a first electric quantity of the first wireless earphone and a second electric quantity of the second wireless earphone S302, when the first electric quantity is greater than the second electric quantity, the wireless earphone compares the second electric quantity with a third electric quantity of the mobile terminal.

S303, the wireless earphone performs a first operation and a second operation in parallel in response to determining that the second electric quantity is less than the third electric quantity, where the first operation is to obtain first audio through the first microphone, the second operation is to obtain second audio through the second microphone, and the first audio and the second audio are part of the first audio data.

S304, the wireless earphone determines a reference parameter of the second audio.

S305, the wireless earphone determines that the first wireless earphone is blocked in response to detecting that a difference between the first parameter of the first audio and the reference parameter is greater than a preset threshold difference, where the first parameter includes at least one of: volume, energy, timbre, and audio frequency.

S306, the wireless earphone disables the first microphone and switches to a third microphone of the second wireless earphone to obtain third audio, where the third audio is audio data other than the first audio in the first audio data.

As can be seen, in this implementation, when both the first wireless earphone and the second wireless earphone are worn, the wireless earphone first determines the first electric quantity of the first wireless earphone and the second electric quantity of the second wireless earphone. When the first electric quantity is greater than the second electric quantity, the wireless earphone performs the first operation and the second operation in parallel, where the first operation is to obtain the first audio through the first microphone, and the second operation is to obtain the second audio through the second microphone. The wireless earphone then determines the reference parameter of the second audio. When the first parameter of the first audio does not match the reference parameter, the wireless earphone determines that the first wireless earphone is blocked. As such, the wireless earphone can detect whether the microphone is blocked without increasing a hardware structure, therefore enriching functions of the wireless earphone and improving convenience of blocking detection. Moreover, the second microphone of the mobile terminal obtains the second audio while the first wireless earphone obtains the first audio, and a parameter of the second audio rather than a preset threshold is used as the reference parameter, so as to detect whether the first microphone of the first wireless earphone is blocked, which is helpful to eliminate environmental interference and improve accuracy of blocking detection. In addition, when both wireless earphones are worn, the first wireless earphone with a higher electric quantity rather than two wireless earphones is used to obtain voice data to detect blocking, the second wireless earphone may only need to obtain the reference parameter, which is beneficial to improve overall usage time of the wireless earphone and improve intelligence of blocking detection.

In addition, when the wireless earphone detects the acquisition instruction for first audio data, the wireless earphone starts blocking detection after the wireless earphone obtains part of the data, which is beneficial to improve real-time performance of blocking detection. When the first wireless earphone is detected to be blocked, the second wireless earphone is switched in time to obtain following voice data, which is beneficial to improve timeliness of implementing measures after detecting that the microphone-hole is blocked.

In addition, when the wireless earphone detects that the first electric quantity is greater than the second electric quantity, both the second wireless earphone and the mobile terminal can be selected to obtain the reference parameter. The mobile phone is selected to obtain the reference parameter when the second electric quantity is less than the third electric quantity, which is conducive to realizing power balance between the wireless earphone and the mobile terminal and increasing usage time of both the wireless earphone and the mobile terminal.

In addition, the wireless earphone determines that the first parameter of the first audio does not match the reference parameter by comparing the difference between the first parameter and the reference parameter with the preset threshold difference, which is simple in algorithm and is beneficial to improve speed of blocking detection.

Figure 4:
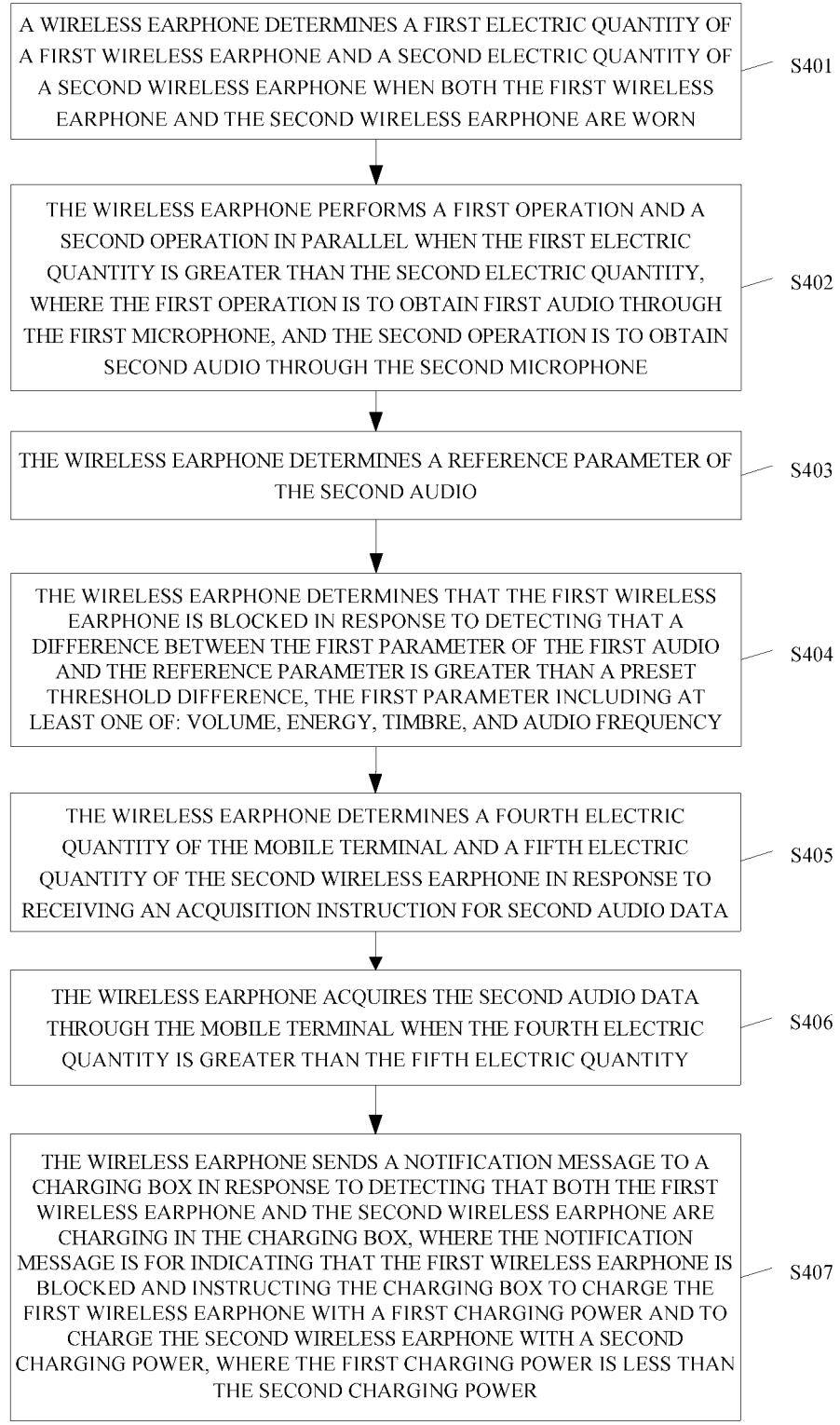
FIG. 4 is a schematic flowchart of a method for detecting blocking of a microphone according to other implementations.

Similar to implementations illustrated in FIG. 2, FIG. 4 is a schematic flowchart of a method for detecting blocking of a microphone according to implementations. As illustrated in FIG. 4, the method for detecting blocking of a microphone includes the following.

S401, the wireless earphone determines a first electric quantity of a first wireless earphone and a second electric quantity of a second wireless earphone when both the first wireless earphone and the second wireless earphone are worn.

S402, the wireless earphone performs a first operation and a second operation in parallel when the first electric quantity is greater than the second electric quantity, where the first operation is to obtain first audio through the first microphone, and the second operation is to obtain second audio through the second microphone.

S403, the wireless earphone determines a reference parameter of the second audio.

S404, the wireless earphone determines that the first wireless earphone is blocked in response to detecting that a difference between the first parameter of the first audio and the reference parameter is greater than a preset threshold difference, where the first parameter includes at least one of: volume, energy, timbre, and audio frequency.

S405, the wireless earphone determines a fourth electric quantity of the mobile terminal and a fifth electric quantity of the second wireless earphone in response to receiving an acquisition instruction for second audio data.

S406, the wireless earphone obtains the second audio data through the mobile terminal when the fourth electric quantity is greater than the fifth electric quantity.

S407, the wireless earphone sends a notification message to a charging box in response to detecting that both the first wireless earphone and the second wireless earphone are charged in the charging box. The notification message is for indicating that the first wireless earphone is blocked and instructing the charging box to charge the first wireless earphone with a first charging power and to charge the second wireless earphone with a second charging power, where the first charging power is less than the second charging power.

As can be seen, in this implementation, when both the first wireless earphone and the second wireless earphone are worn, the wireless earphone first determines the first electric quantity of the first wireless earphone and the second electric quantity of the second wireless earphone. When the first electric quantity is greater than the second electric quantity, the wireless earphone performs the first operation and the second operation in parallel, where the first operation is to obtain the first audio through the first microphone, and the second operation is to obtain the second audio through the second microphone. The wireless earphone then determines the reference parameter of the second audio. When the first parameter of the first audio does not match the reference parameter, the wireless earphone determines that the first wireless earphone is blocked. As such, the wireless earphone can detect whether the microphone is blocked without increasing a hardware structure, therefore enriching functions of the wireless earphone and improving convenience of blocking detection. Moreover, the second microphone of the mobile terminal obtains the second audio while the first wireless earphone obtains the first audio, and a parameter of the second audio rather than a preset threshold is used as the reference parameter, so as to detect whether the first microphone of the first wireless earphone is blocked, which is helpful to eliminate environmental interference and improve accuracy of blocking detection. In addition, when both wireless earphones are worn, the first wireless earphone with a higher electric quantity rather than two wireless earphones is used to obtain voice data to detect blocking, the second wireless earphone may only need to obtain the reference parameter, which is beneficial to improve overall usage time of the wireless earphone and improve intelligence of blocking detection.

In addition, after the wireless earphone detects that the first microphone of the first wireless earphone is blocked, when the acquisition instruction for the second audio data is detected, the fourth electric quantity of the mobile terminal and the fifth electric quantity of the second wireless earphone are determined respectively, the mobile terminal with a greater electric quantity is used to obtain the second audio data, which is beneficial to improve flexibility of obtaining the second audio data, and intelligence of implementing measures after detecting that a microphone-hole is blocked.

In addition, the wireless earphone reports the notification message to the charging box after determining that the first microphone is blocked, so that when the charging box charges the first wireless earphone and the second wireless earphone at the same time, the charging power allocated to the second wireless earphone is greater than the charging power allocated to the first wireless earphone due to the second wireless earphone being used more, which is beneficial to increase usage time of the second wireless earphone in a normal state.

Figure 5:
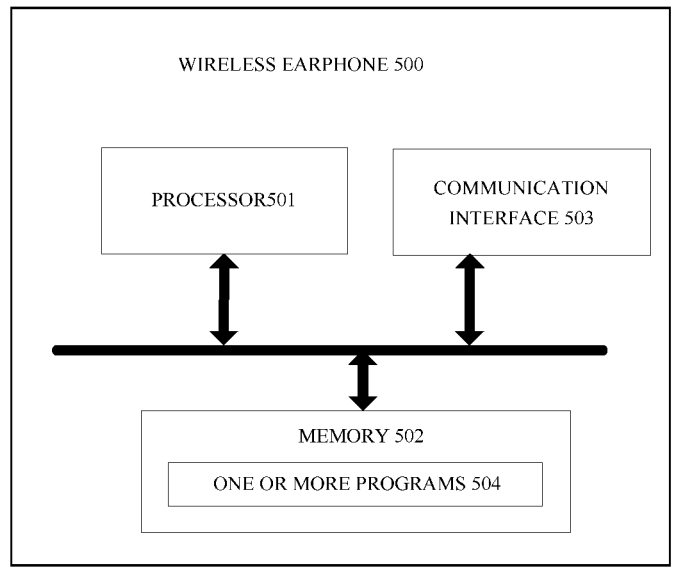
FIG. 5 is a schematic structural diagram of a wireless earphone according to implementations.

Similar to implementations illustrated in FIG. 2, FIG. 3, and FIG. 4, FIG. 5 is a schematic structural diagram of a wireless earphone 500 according to implementations. The wireless earphone is connected with a mobile terminal, the wireless earphone includes a first wireless earphone and a second wireless earphone, the first wireless earphone has a first microphone, the second wireless earphone has a third microphone, and the mobile terminal has a second microphone. As illustrated in FIG. 5, the wireless earphone 500 includes a processor 501, a memory 502, a communication interface 503, and one or more programs 504 stored in the memory 502 and executed by the processor 501. The one or more programs 504 include instructions for performing the following operations.

A first operation and a second operation are performed in parallel when the first electric quantity is greater than the second electric quantity, where the first operation is at least one of: to obtain first audio through the first microphone or to obtain first audio through the third microphone, and the second operation is to obtain second audio through the second microphone. A reference parameter of the second audio is determined. At least one of the first wireless earphone or the second wireless earphone is determined to be blocked in response to detecting that a first parameter of the first audio does not match the reference parameter.

As can be seen, in this implementation, the wireless earphone performs the first operation and the second operation in parallel, and the wireless earphone then determines the reference parameter of the second audio. When the first parameter of the first audio does not match the reference parameter, the wireless earphone determines that at least one of the first wireless earphone or the second wireless earphone is blocked. As such, the wireless earphone can detect whether the microphone is blocked without increasing a hardware structure, therefore enriching functions of the wireless earphone and improving convenience of blocking detection. Moreover, the second microphone of the mobile terminal obtains the second audio, and a parameter of the second audio rather than a preset threshold is used as the reference parameter, so as to detect whether the wireless earphone is blocked, which is helpful to eliminate environmental interference and improve accuracy of blocking detection.

As an implementation, the one or more programs further comprise instructions for performing the following operations. A first electric quantity of the first wireless earphone and a second electric quantity of the second wireless earphone are determined when both the first wireless earphone and the second wireless earphone are worn. In terms of performing the first operation and the second operation in parallel, the one or more programs 504 include instructions for performing the first operation and the second operation in parallel when the first electric quantity is greater than the second electric quantity, wherein the first operation is to obtain first audio through the first microphone. In terms of determining that the at least one of the first wireless earphone or the second wireless earphone is blocked, the one or more programs comprise instructions for determining that the first wireless earphone is blocked.

As an implementation, in terms of detecting that the first parameter of the first audio does not match the reference parameter, the one or more programs 504 include instructions for performing the following operations. A difference between the first parameter of the first audio and the reference parameter is detected to be greater than a preset threshold difference, where the first parameter includes at least one of: volume, energy, timbre, and audio frequency.

As an implementation, when the second wireless earphone is not blocked, in terms of performing the first operation and the second operation in parallel when the first electric quantity is greater than the second electric quantity, the one or more programs 504 include instructions for performing the following operations. The second electric quantity is compared with a third electric quantity of the mobile terminal when the first electric quantity is greater than the second electric quantity. The first operation and the second operation are performed in parallel in response to determining that the second electric quantity is greater than the third electric quantity.

As an implementation, the one or more programs 504 further include instructions for performing the following operations. An acquisition instruction for first audio data is received before the first electric quantity of the first wireless earphone and the second electric quantity of the second wireless earphone are determined. The first audio and the second audio are part of the first audio data. The one or more programs 504 further include instructions for performing the following operations. After the first wireless earphone is determined to be blocked, the first microphone is disabled and a third microphone of the second wireless earphone is switched to obtain third audio, where the third audio is audio data other than the first audio in the first audio data.

As an implementation, the one or more programs 504 further include instructions for performing the following operations. After the first wireless earphone is determined to be blocked, a fourth electric quantity of the mobile terminal and a fifth electric quantity of the second wireless earphone are determined in response to receiving an acquisition instruction for second audio data. The second audio data is obtained through the mobile terminal when the fourth electric quantity is greater than the fifth electric quantity.

As an implementation, the one or more programs 504 further include instructions for performing the following operations. After the first wireless earphone is determined to be blocked, a notification message is sent to a charging box in response to detecting that both the first wireless earphone and the second wireless earphone are charged in the charging box. The notification message is for indicating that the first wireless earphone is blocked and instructing the charging box to charge the first wireless earphone with a first charging power and to charge the second wireless earphone with a second charging power, where the first charging power is less than the second charging power.

The foregoing solution of the implementations of the present disclosure is mainly described from the viewpoint of execution process of the method. It can be understood that, in order to implement the above functions, the electronic device includes hardware structures and/or software modules corresponding to the respective functions. Those skilled in the art should readily recognize that, in combination with the example units and scheme steps described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementations should not be considered as beyond the scope of the present disclosure.

Figure 6A:
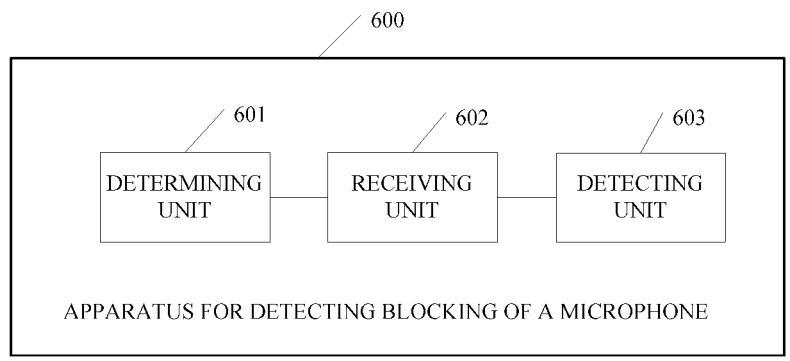
FIG. 6A is a block diagram illustrating functional units of an apparatus for detecting blocking of a microphone according to implementations.

According to the implementations of the present disclosure, functional units may be divided for the first wireless earphone in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations is schematic, and is merely a logical function division, and there may be other division manners in actual implementation.

FIG. 6 is a block diagram illustrating functional units of an apparatus 600 for detecting blocking of a microphone according to implementations. The apparatus 600 for detecting blocking of a microphone is applicable to a wireless earphone, the wireless earphone is connected with a mobile terminal, the wireless earphone includes a first wireless earphone and a second wireless earphone, the first wireless earphone has a first microphone, and the mobile terminal has a second microphone. The apparatus 600 for detecting blocking of a microphone includes a determining unit 601, a receiving unit 602, and a detecting unit 603.

The determining unit 601 is configured to determine a first electric quantity of the first wireless earphone and a second electric quantity of the second wireless earphone when both the first wireless earphone and the second wireless earphone are worn.

The receiving unit 602 is configured to perform a first operation and a second operation in parallel when the first electric quantity is greater than the second electric quantity, where the first operation is to obtain first audio through the first microphone, and the second operation is to obtain second audio through the second microphone.

The determining unit 601 is further configured to determine a reference parameter of the second audio.

The detecting unit 603 is configured to determine that the first wireless earphone is blocked in response to detecting that a first parameter of the first audio does not match the reference parameter.

As can be seen, in this implementation, when both the first wireless earphone and the second wireless earphone are worn, the wireless earphone first determines the first electric quantity of the first wireless earphone and the second electric quantity of the second wireless earphone. When the first electric quantity is greater than the second electric quantity, the wireless earphone performs the first operation and the second operation in parallel, where the first operation is to obtain the first audio through the first microphone, and the second operation is to obtain the second audio through the second microphone. The wireless earphone then determines the reference parameter of the second audio. When the first parameter of the first audio does not match the reference parameter, the wireless earphone determines that the first wireless earphone is blocked. As such, the wireless earphone can detect whether the microphone is blocked without increasing a hardware structure, therefore enriching functions of the wireless earphone and improving convenience of blocking detection. Moreover, the second microphone of the mobile terminal obtains the second audio while the first wireless earphone obtains the first audio, and a parameter of the second audio rather than a preset threshold is used as the reference parameter, so as to detect whether the first microphone of the first wireless earphone is blocked, which is helpful to eliminate environmental interference and improve accuracy of blocking detection. In addition, when both wireless earphones are worn, the first wireless earphone with a higher electric quantity rather than two wireless earphones is used to obtain voice data to detect blocking, the second wireless earphone may only need to obtain the reference parameter, which is beneficial to improve overall usage time of the wireless earphone and improve intelligence of blocking detection.

As an implementation, in terms of detecting that the first parameter of the first audio does not match the reference parameter, the detecting unit 603 is configured to detect that a difference between the first parameter of the first audio and the reference parameter is greater than a preset threshold difference, where the first parameter includes at least one of: volume, energy, timbre, and audio frequency.

As an implementation, when the second wireless earphone is not blocked, in terms of performing the first operation and the second operation in parallel when the first electric quantity is greater than the second electric quantity, the receiving unit 602 is configured to: compare the second electric quantity with a third electric quantity of the mobile terminal when the first electric quantity is greater than the second electric quantity; perform the first operation and the second operation in parallel in response to determining that the second electric quantity is greater than the third electric quantity.

Figure 6B:
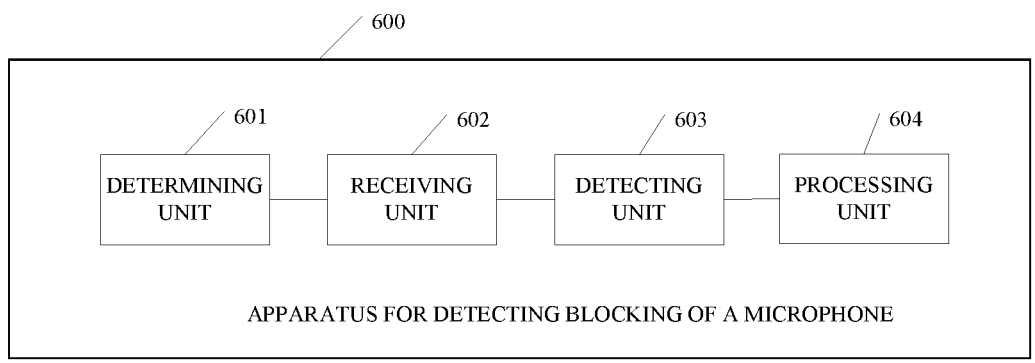
FIG. 6B is a block diagram illustrating functional units of an apparatus for detecting blocking of a microphone according to other implementations.

As an implementation, as illustrated in FIG. 6B, the apparatus 600 for detecting blocking of a microphone further includes a processing unit 604. The detecting unit 603 is further configured to receive an acquisition instruction for first audio data before determining the first electric quantity of the first wireless earphone and the second electric quantity of the second wireless earphone. The first audio and the second audio are part of the first audio data. The processing unit 604 is configured to disable the first microphone and switch to a third microphone of the second wireless earphone to obtain third audio after determining that the first wireless earphone is blocked, where the third audio is audio data other than the first audio in the first audio data.

As an implementation, the apparatus 600 for detecting blocking of a microphone further includes a processing unit 604. The processing unit 604 is configured to determine a fourth electric quantity of the mobile terminal and a fifth electric quantity of the second wireless earphone in response to receiving an acquisition instruction for second audio data after the first wireless earphone is determined to be blocked; obtain the second audio data through the mobile terminal when the fourth electric quantity is greater than the fifth electric quantity.

As an implementation, the apparatus 600 for detecting blocking of a microphone further includes a processing unit 604. The processing unit 604 is configured to send a notification message to a charging box in response to detecting that both the first wireless earphone and the second wireless earphone are charged in the charging box after the first wireless earphone is determined to be blocked. The notification message is for indicating that the first wireless earphone is blocked and instructing the charging box to charge the first wireless earphone with a first charging power and to charge the second wireless earphone with a second charging power, where the first charging power is less than the second charging power.

The receiving unit 602 may be a microphone or a transceiver, the determining unit 601 may be a microphone, a processor, or a sensor, the detecting unit 603 may be a processor, a transceiver, or a sensor, and the processing unit 604 may be a processor.

Implementations further provide a computer storage medium. The computer storage medium is configured to store computer programs for electronic data interchange (EDI) which, when executed, are operable with a computer to perform some or all operations of any one of the foregoing method implementations.

Implementations further provide a computer program product. The computer program product includes a non-transitory computer-readable storage medium that stores computer programs. The computer programs are operable with a computer to execute some or all operations of any one of the foregoing method implementations.

It is to be noted that, for the sake of simplicity, the foregoing method implementations are described as a series of action combinations, however, it will be appreciated by those skilled in the art that the present disclosure is not limited by the sequence of actions described. According to implementations, certain steps or operations may be performed in other order or simultaneously. Besides, it will be appreciated by those skilled in the art that the implementations described in the specification are exemplary implementations and the actions and modules involved are not necessarily essential to the present disclosure.

In the above implementations, description of each implementation has its own emphasis. For details not described in one implementation, reference can be made to related part in other implementations.

It will be appreciated that the apparatuses disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one. The integrated unit may take the form of hardware or a software functional unit.

If the integrated units are implemented as software functional units and sold or used as standalone products, they may be stored in a computer readable storage medium. Based on such an understanding, the essential technical solution, or the portion that contributes to the prior art, or all or part of the technical solution of the disclosure may be embodied as software products. The computer software products can be stored in a storage medium and may include multiple instructions that, when executed, can cause a computing device, e.g., a personal computer, a server, a network device, etc, to execute some or all operations of the methods described in various implementations. The above storage medium may include various kinds of media that can store program codes, such as a universal serial bus (USB) flash disk, a read only memory (ROM), a random access memory (RAM), a mobile hard drive, a magnetic disk, or an optical disk.

It will be understood by those of ordinary skill in the art that all or part of the various methods of the implementations described above may be accomplished by means of a program to instruct associated hardware. The program may be stored in a computer-readable memory, which may include a flash memory, a ROM, a RAM, a magnetic disk, an optical disk, and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for detecting blocking of a microphone, applicable to a wireless earphone that is connected with a mobile terminal, the wireless earphone comprising a first wireless earphone and a second wireless earphone, the first wireless earphone having a first microphone, the mobile terminal having a second microphone, and the method comprising:

determining a first electric quantity of the first wireless earphone and a second electric quantity of the second wireless earphone when both the first wireless earphone and the second wireless earphone are worn;

performing a first operation and a second operation in parallel when the first electric quantity is greater than the second electric quantity, wherein the first operation is to obtain first audio through the first microphone, and the second operation is to obtain second audio through the second microphone;

determining a reference parameter of the second audio; and determining that the first wireless earphone is blocked in response to detecting that a first parameter of the first audio does not match the reference parameter.

2. The method of claim 1, wherein detecting that the first parameter of the first audio does not match the reference parameter comprises:

detecting that a difference between the first parameter of the first audio and the reference parameter is greater than a preset threshold difference, the first parameter comprising at least one of: volume, energy, timbre, and audio frequency.

3. The method of claim 1, wherein performing the first operation and the second operation in parallel when the first electric quantity is greater than the second electric quantity comprises:

comparing the second electric quantity with a third electric quantity of the mobile terminal when the first electric quantity is greater than the second electric quantity; and performing the first operation and the second operation in parallel in response to determining that the second electric quantity is less than the third electric quantity.

4. The method of claim 1, wherein the second wireless earphone has a third microphone and the method further comprises:

before determining the first electric quantity of the first wireless earphone and the second electric quantity of the second wireless earphone:

receiving an acquisition instruction for first audio data;

wherein the first audio and the second audio are part of the first audio data, and the method further comprises:

when the third microphone of the second wireless earphone is not blocked and after determining that the first wireless earphone is blocked:

disabling the first microphone and switching to the third microphone of the second wireless earphone to obtain third audio, wherein the third audio is audio data other than the first audio in the first audio data.

5. The method of claim 1, further comprising:

after determining that the first wireless earphone is blocked:

determining a fourth electric quantity of the mobile terminal and a fifth electric quantity of the second wireless earphone in response to receiving an acquisition instruction for second audio data; and obtaining the second audio data through the mobile terminal when the fourth electric quantity is greater than the fifth electric quantity.

6. The method of claim 1, further comprising:

after determining that the first wireless earphone is blocked:

sending a notification message to a charging box in response to detecting that both the first wireless earphone and the second wireless earphone are charged in the charging box;

wherein the notification message is for indicating that the first wireless earphone is blocked and instructing the charging box to charge the first wireless earphone with a first charging power and to charge the second wireless earphone with a second charging power, and the first charging power is less than the second charging power.

7. The method of claim 1, further comprising:

before determining the first electric quantity of the first wireless earphone and the second electric quantity of the second wireless earphone when both the first wireless earphone and the second wireless earphone are worn:

obtaining a first gesture parameter of the first wireless earphone and a second gesture parameter of the second wireless earphone; and determining that both the first wireless earphone and the second wireless earphone are worn according to the first gesture parameter and the second gesture parameter.

8. The method of claim 1, further comprising:

before determining the first electric quantity of the first wireless earphone and the second electric quantity of the second wireless earphone when both the first wireless earphone and the second wireless earphone are worn:

obtaining first pressure values of a plurality of first pressure sensors in the first wireless earphone and second pressure values of a plurality of second pressure sensors in the second wireless earphone; and determining that both the first wireless earphone and the second wireless earphone are worn according to the plurality of the first pressure values and the plurality of the second pressure values.

9. The method of claim 1, further comprising:

before determining the first electric quantity of the first wireless earphone and the second electric quantity of the second wireless earphone when both the first wireless earphone and the second wireless earphone are worn:

detecting a first communication connection state between the first wireless earphone and the mobile terminal and a second communication connection state between the second wireless earphone and the mobile terminal; and determining that both the first wireless earphone and the second wireless earphone are worn according to the first communication connection state and the second communication connection state.

10. A wireless earphone that is connected with a mobile terminal, the wireless earphone comprising a first wireless earphone and a second wireless earphone, the first wireless earphone having a first microphone, the mobile terminal having a second microphone, the second wireless earphone having a third microphone, and the wireless earphone further comprising a processor, a memory, and one or more programs stored in the memory and executed by the processor, wherein the one or more programs comprise instructions for performing actions, comprising:

determining a first electric quantity of the first wireless earphone and a second electric quantity of the second wireless earphone when both the first wireless earphone and the second wireless earphone are worn;

performing a first operation and a second operation in parallel when the first electric quantity is greater than the second electric quantity, wherein the first operation is at least one of: to obtain first audio through the first microphone or to obtain first audio through the third microphone, and the second operation is to obtain second audio through the second microphone;

determining a reference parameter of the second audio; and determining that at least one of the first wireless earphone or the second wireless earphone is blocked in response to detecting that a first parameter of the first audio does not match the reference parameter.

11. The wireless earphone of claim 10, wherein the first operation is to obtain first audio through the first microphone; and in terms of determining that the at least one of the first wireless earphone or the second wireless earphone is blocked, the one or more programs comprise instructions for performing actions, comprising: determining that the first wireless earphone is blocked.

12. The wireless earphone of claim 10, wherein in terms of detecting that the first parameter of the first audio does not match the reference parameter, the one or more programs comprise instructions for performing actions, comprising:

detecting that a difference between the first parameter of the first audio and the reference parameter is greater than a preset threshold difference, the first parameter comprising at least one of: volume, energy, timbre, and audio frequency.

13. The wireless earphone of claim 11, wherein in terms of performing the first operation and the second operation in parallel when the first electric quantity is greater than the second electric quantity, the one or more programs comprise instructions for performing actions, comprising:

comparing the second electric quantity with a third electric quantity of the mobile terminal when the first electric quantity is greater than the second electric quantity; and performing the first operation and the second operation in parallel in response to determining that the second electric quantity is less than the third electric quantity.

14. The wireless earphone of claim 11, wherein the one or more programs further comprise instructions for performing actions, comprising:

before determining the first electric quantity of the first wireless earphone and the second electric quantity of the second wireless earphone:

receiving an acquisition instruction for first audio data;

wherein the first audio and the second audio are part of the first audio data, and the one or more programs further comprise instructions for performing actions, comprising:

when the third microphone of the second wireless earphone is not blocked and after determining that the first wireless earphone is blocked:

disabling the first microphone and switching to the third microphone of the second wireless earphone to obtain third audio, wherein the third audio is audio data other than the first audio in the first audio data.

15. The wireless earphone of claim 11, wherein the one or more programs further comprise instructions for performing actions, comprising:
after determining that the first wireless earphone is blocked:
determining a fourth electric quantity of the mobile terminal and a fifth electric quantity of the second wireless earphone in response to receiving an acquisition instruction for second audio data; and
obtaining the second audio data through the mobile terminal when the fourth electric quantity is greater than the fifth electric quantity.

16. The wireless earphone of claim 11, wherein the one or more programs further comprise instructions for performing actions, comprising:
after determining that the first wireless earphone is blocked:
sending a notification message to a charging box in response to detecting that both the first wireless earphone and the second wireless earphone are charged in the charging box;
wherein the notification message is for indicating that the first wireless earphone is blocked and instructing the charging box to charge the first wireless earphone with a first charging power and to charge the second wireless earphone with a second charging power, and the first charging power is less than the second charging power.

17. The wireless earphone of claim 11, wherein the one or more programs further comprise instructions for performing actions, comprising:
before determining the first electric quantity of the first wireless earphone and the second electric quantity of the second wireless earphone when both the first wireless earphone and the second wireless earphone are worn:
obtaining a first gesture parameter of the first wireless earphone and a second gesture parameter of the second wireless earphone; and
determining that both the first wireless earphone and the second wireless earphone are worn according to the first gesture parameter and the second gesture parameter.

18. The wireless earphone of claim 11, wherein the one or more programs further comprise instructions for performing actions, comprising:
before determining the first electric quantity of the first wireless earphone and the second electric quantity of the second wireless earphone when both the first wireless earphone and the second wireless earphone are worn:
obtaining first pressure values of a plurality of first pressure sensors in the first wireless earphone and second pressure values of a plurality of second pressure sensors in the second wireless earphone; and
determining that both the first wireless earphone and the second wireless earphone are worn according to the plurality of the first pressure values and the plurality of the second pressure values.

19. The wireless earphone of claim 11, wherein the one or more programs further comprise instructions for performing actions, comprising:
before determining the first electric quantity of the first wireless earphone and the second electric quantity of the second wireless earphone when both the first wireless earphone and the second wireless earphone are worn:
detecting a first communication connection state between the first wireless earphone and the mobile terminal and a second communication connection state between the second wireless earphone and the mobile terminal; and
determining that both the first wireless earphone and the second wireless earphone are worn according to the first communication connection state and the second communication connection state.

20. A non-transitory computer-readable storage medium configured to store computer programs for electronic data interchange (EDI) which, when executed, are operable with a computer to perform actions, comprising:
determining a first electric quantity of a first wireless earphone and a second electric quantity of a second wireless earphone when both the first wireless earphone and the second wireless earphone are worn;
performing a first operation and a second operation in parallel when the first electric quantity is greater than the second electric quantity, wherein the first operation is to obtain first audio through a first microphone, and the second operation is to obtain second audio through a second microphone;
determining a reference parameter of the second audio; and
determining that the first wireless earphone is blocked in response to detecting that a first parameter of the first audio does not match the reference parameter.

* * * * *